US008500270B2

(12) United States Patent
Kurtin et al.

(10) Patent No.: US 8,500,270 B2
(45) Date of Patent: Aug. 6, 2013

(54) STRUCTURE AND METHOD FOR FACE FORM RETENTION IN PLASTIC EYEGLASSES AND EYEGLASS FRAMES

(75) Inventors: Stephen Kurtin, Sherman Oaks, CA (US); Terence J. Villalovos, Simi Valley, CA (US); Roberto Rosillo, Van Nuys, CA (US); James G. Coates, Sun Valley, CA (US)

(73) Assignee: Zoom Focus Eyewear, LLC, Van Nuys, CA (US)

( * ) Notice: Subject to any disclaimer, the term of this patent is extended or adjusted under 35 U.S.C. 154(b) by 4 days.

(21) Appl. No.: 13/345,364

(22) Filed: Jan. 6, 2012

(65) Prior Publication Data

US 2013/0176527 A1    Jul. 11, 2013

(51) Int. Cl.
*G02C 5/02*    (2006.01)

(52) U.S. Cl.
CPC ..................... *G02C 5/02* (2013.01)
USPC .......................... 351/129; 351/124

(58) Field of Classification Search
CPC ..................................... G02C 5/02
USPC ................................. 351/124–135
See application file for complete search history.

(56) References Cited

U.S. PATENT DOCUMENTS

| | | | |
|---|---|---|---|
| 1,083,700 A * | 1/1914 | Pels-Leusden | 351/125 |
| 1,269,383 A | 6/1918 | Cady | |
| 1,428,697 A | 9/1922 | Leytham | |
| 1,537,733 A | 5/1925 | Beattey | |
| 1,630,258 A | 5/1927 | Durgin | |
| 1,664,095 A | 3/1928 | Stevens | |
| 2,243,769 A | 3/1941 | Nerney | |
| 2,243,770 A | 5/1941 | Nerney | |
| 2,997,917 A * | 8/1961 | Baer | 351/93 |
| 3,601,478 A | 8/1971 | Ramp | |
| 4,302,080 A | 11/1981 | Bononi | |
| 4,443,074 A | 4/1984 | Giacomelli | |
| 6,669,396 B2 | 12/2003 | Mattle | |
| 7,232,215 B2 * | 6/2007 | McNeal et al. | 351/129 |
| 2007/0008482 A1 | 1/2007 | Teng | |

FOREIGN PATENT DOCUMENTS

| | | |
|---|---|---|
| DE | 1808840 | 6/1970 |
| FR | 624380 | 7/1927 |
| WO | WO-2006/118769 | 11/2006 |

OTHER PUBLICATIONS

"International Search Report and Written Opinion of the International Searching Authority Dated Mar. 5, 2013, International Application No. PCT/US2012/070704", (Mar. 5, 2013).

* cited by examiner

*Primary Examiner* — Huy K Mai
(74) *Attorney, Agent, or Firm* — Blakely Sokoloff Taylor & Zafman LLP

(57) ABSTRACT

Structure and method for face form retention in eyeglasses and eyeglass frames for substantially preventing creep from altering the face form. The method comprises providing an eyeglass frame front having a space in the bridge region for receiving a metallic strip, providing the metallic strip having a width approximately matching the width of the space in the eyeglass frame front and a thickness that is less than its width, and fastening the metallic strip in the space in the bridge region so that the width of the metallic strip rigidifies the eyeglass frame front to retain its face form. Various specific methods and structures are disclosed.

27 Claims, 2 Drawing Sheets

US 8,500,270 B2

STRUCTURE AND METHOD FOR FACE FORM RETENTION IN PLASTIC EYEGLASSES AND EYEGLASS FRAMES

BACKGROUND OF THE INVENTION

1. Field of the Invention

The present invention relates to the field of eyeglasses and eyeglass frames and methods of manufacture thereof.

2. Prior Art

Cellulose acetate is an attractive material for the manufacture of eyeglass frames, largely because it is easy to work and offers remarkable cosmetic appeal. Accordingly the prior art will be discussed in this context, even though the use of the present invention is not so limited, but instead is also applicable to eyeglass frames fabricated from other plastics.

Cellulose acetate has two primary deficiencies, namely: i) it has a tendency to shrink somewhat over time, and ii) it has poor resistance to mechanical creep. The invention described herein is a technique to overcome the latter, particularly as it affects what is referred to herein as 'face form'. In particular, a typical pair of eyeglasses is configured with the temples conforming to the wearer's head, but sized so that, when worn, the temples elastically deflect to help keep the eyeglasses in position. However this creates a bending stress on the bridge of the eyeglasses, which for cellulose acetate, overtime will result in permanent deformation and, hence, a loss of the desired 'face form'.

DETAILED DESCRIPTION OF THE PREFERRED EMBODIMENTS

Figure 1:
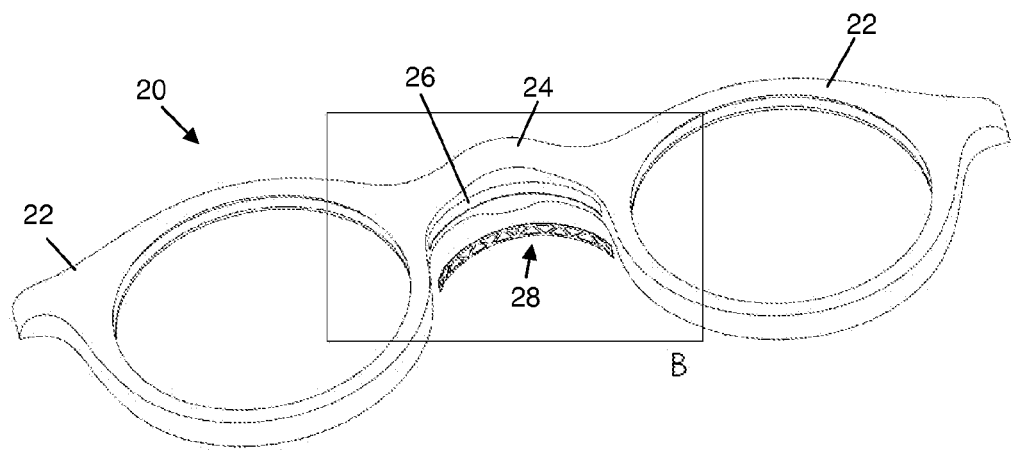
FIG. 1 is an exploded view of an eyeglass frame front and sheet metal truss structure.
Figure 2:
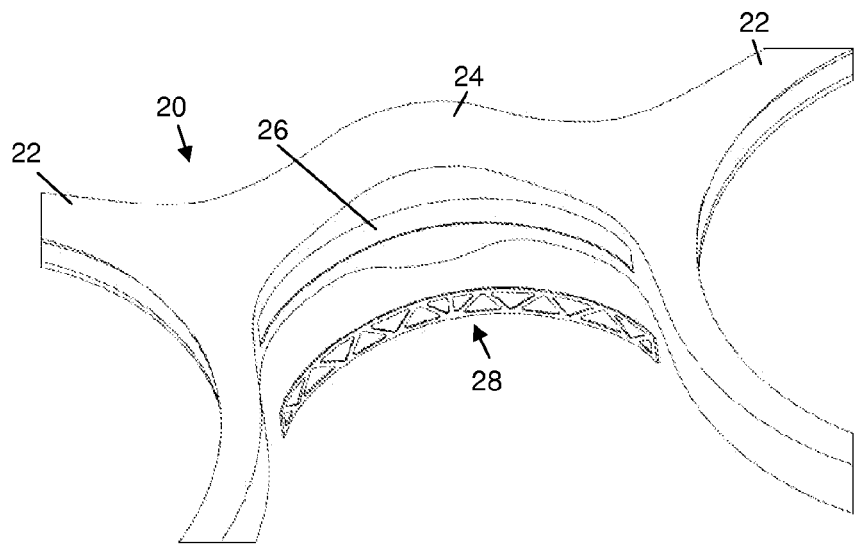
FIG. 2 is a view of region B of FIG. 1, taken on an expanded scale.

The present invention comprises methods and structures to effectively overcome the creep in the bridge region of plastic eyeglass frames, particularly for such eyeglass frames as may be made from cellulose acetate. In that regard, the typical eyeglass frame front 20 may be seen in FIG. 1. The eyeglass frame front, generally indicated by the numeral 20, has rim regions 22 for receiving appropriate lenses, the rim regions 22 being integrally coupled by a bridge region 24 configured to comfortably fit over and rest on the user's nose. As part of the fabrication of the eyeglass frame front 20, a space (or depression) is formed in the lower part of the bridge region of the eyeglass frame front 20, typically having depth on the order of 0.010 to 0.050 inches and preferably of substantially uniform depth along its length, though the depression may taper down to zero depth at the ends thereof. These parameters, of course, are exemplary only and not a limitation of the invention. These elements are shown on an expanded scale in FIG. 2, which is an illustration of region B of FIG. 1 taken on the expanded scale.

In the case of cellulose acetate eyeglass frames, the eyeglass frame fronts are typically machined from solid material having no face form. In one embodiment of the invention, a sheet metal truss structure 28 is formed and the eyeglass frame fronts are machined, including the space 26 under the bridge region, and the face form on the eyeglass frame fronts is formed, typically by hot pressing, prior to the truss being secured with an adhesive/filler, preferably but not necessarily, a room temperature (such as approximately 100° F. or less) setting epoxy, all of which are collectively referred to herein and in the claims to follow as a cement. As an alternate embodiment, the space may be machined into the bridge region after the face form has been developed, into which the metal truss is then secured. In still a further embodiment, one can start with an as machined eyeglass frame front having no face form but with the appropriate space 26 machined into the bottom surface of the bridge region, with the metal truss then being secured in space 26 and the face form then created by hot pressing the face form into the assembly of the cellulose acetate eyeglass frame front with the truss structure secured therein.

Figure 3:
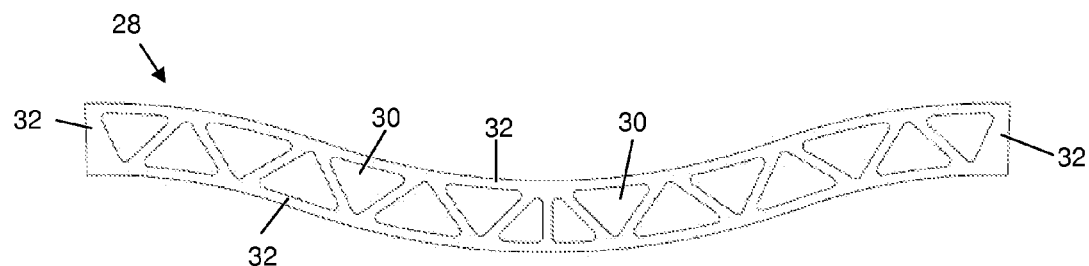
FIG. 3 is an illustration of an exemplary sheet metal truss.

One could, of course, use a simple sheet metal strip, such as by way of example a stainless steel strip, in place of the sheet metal truss structure 28 shown in FIG. 3. Such a sheet metal strip would preferably be substantially flat, at least until formed in the space in the bridge region of the eyeglass frame front. However the truss structure is preferred over a plain strip as described for various reasons. First, if the truss structure is held in place by a clear epoxy or other clear cement, it is much more decorative than a simple plain strip of metal, yet still has nearly the same strength in resisting the loss of face form because of the truss structure. Further, such structures may be easily manufactured by chemical etching techniques, though other techniques could be used, such as by way of example punching. Aside from the decorative characteristic of the truss structure, such a structure is also advantageous in that when fastened or encapsulated in place, the cement used will reach through the openings in the truss structure and bond to the plastic of the eyeglass frame front. This has a number of advantages. In particular, assuming shiny sheet metal is used, a suitable cement may not bond well to the shiny surface, so that if a substantial force was tending to increase or decrease the face form, the truss structure cannot separate and start to buckle. Otherwise, without good adhesion to the sheet metal strip, the same could start to buckle, which in turn could push out the relatively thin encapsulation layer so as to effectively fail. The truss structure allows cementing (encapsulation) through the open structure to securely restrain the truss structure throughout its area to provide known and repeatable face form retention. With the truss structure so retained, it cannot buckle, but instead will retain the face form against any tendencies of the eyeglass frame fronts to creep with time and will also provide a resistance to short term extraordinary forces, pretty much up to the failure point of a border region of the truss structure. Finally, in comparison to a solid strip, the truss structure reduces the weight of the metallic strip, though even a solid metallic strip will not have an excessive weight.

Whether a simple metallic strip, or the metallic strip includes open areas circumscribed by border regions wherein the open areas of the metallic strip define a truss structure within and integral with the border regions, the metallic strip would have a length exceeding its width, and a width exceeding its thickness. The width of the metallic strip preferably is approximately or generally equal to the width of the depression, which includes being slightly wider than the depression (such as not exceeding the width of the depression by more than 0.01 or 0.02 inches). More preferably, the width of the metallic strip would not exceed a width that distorts the metallic strip when it is forced into the depression, nor be less than a width that is less than the width of the depression by an amount that allows a visible or discernable misalignment of the strip in the depression. All of the foregoing comprise a width of the metallic strip that is approximately or generally equal to the width of the depression. Note also, regardless of the width of the metallic strip, such width need not be uniform along the length of the strip. Further, the length of the metallic strip at the center of the width need not be a straight line, as may be seen in FIG. 3. However, whatever the configuration of the metallic strip, it is primarily the width of the metal strip in the bridge region of the eyeglass frame front that provides the rigidity or rigidifying characteristic to maintain the face form, not the thickness of the metallic strip.

Figure 4:
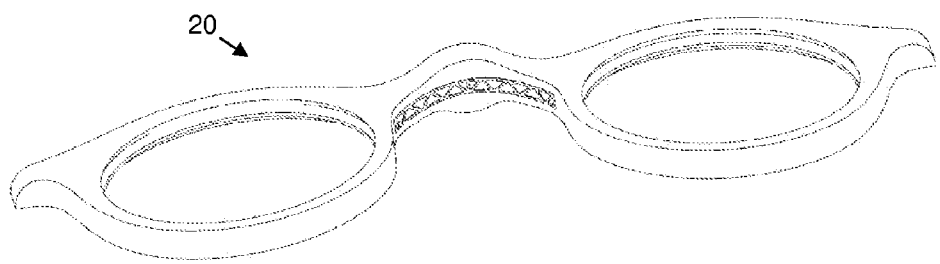
FIG. 4 is an illustration of a completed eyeglass frame front assembly.

A finished eyeglass frame front of a preferred embodiment is shown in FIG. 4. As shown therein, the sheet metal truss structure has been cemented in place with a clear cement such as clear room temperature curing epoxy, with the exposed surface of the cement being finished to conform to the shape of the bridge.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of rigidifying an eyeglass frame front comprising:
    providing an eyeglass frame front having a space in the bottom of the bridge region for receiving a metallic strip;
    providing the metallic strip having a width approximately matching the width of the space in the eyeglass frame front and a thickness that is less than its width, and
    fastening the metallic strip in the space in the bottom of the bridge region so that the width of the metallic strip rigidifies the eyeglass frame front.

2. The method of claim 1 wherein the space is in the bottom of the bridge of the eyeglass frame front.

3. The method of claim 2 wherein the metallic strip is fastened in the space in the bridge region using a cement.

4. The method of claim 3 wherein the metallic strip is encapsulated by the cement.

5. The method of claim 4 wherein the cement is a room temperature curing epoxy.

6. The method of claim 5 further comprising finishing the exposed surface of the cement to conform to the shape of the bridge.

7. The method of claim 1 wherein the metallic strip is provided with open areas circumscribed by border regions.

8. The method of claim 7 wherein the open areas of the metallic strip define a truss structure within and integral with the border regions.

9. The method of claim 8 wherein the metallic strip is fabricated by photo-chemical machining.

10. The method of claim 8 wherein the metallic strip is fabricated by stamping.

11. The method of claim 1 wherein the eyeglass frame front is fabricated from cellulose acetate.

12. The method of claim 11 wherein the space is machined into the bridge region of the eyeglass frame front.

13. The method of claim 12 wherein the face form is developed by hot pressing the eyeglass frame front before the metallic strip is fastened in the space in the bridge region.

14. The method of claim 12 wherein the face form is developed by hot pressing the eyeglass frame front after the metallic strip is fastened in the space in the bridge region.

15. A method of rigidifying an eyeglass frame to retain its face form comprising:
    providing an eyeglass frame front having a space in the bottom of the bridge region;
    providing a metallic strip having a width approximately matching the width of the space in the eyeglass frame front, the metallic strip including open areas circumscribed by border regions, the open areas of the metallic strip defining a truss structure within and integral with the border regions;
    encapsulating the metallic strip in the space in the bridge region with a cement so that the face form is retained by the width of the metallic strip; and
    finishing the exposed surface of the cement to conform to the shape of the bridge.

16. The method of claim 15 wherein the cement is a room temperature curing epoxy.

17. A method of rigidifying an eyeglass frame to retain its face form comprising:
    providing a cellulose acetate eyeglass frame front having a space in the bottom of the bridge region;
    providing a metallic strip having a width generally matching the width of the space in the eyeglass frame front, the metallic strip including open areas circumscribed by border regions, the open areas of the metallic strip defining a truss structure within and integral with the border regions;
    encapsulating the metallic strip in the space in the bridge region using a clear, room temperature curing epoxy cement so that the width of the metallic strip rigidifies the eyeglass frame to retain its face form; and
    finishing the exposed surface of the cement to conform to the shape of the bridge.

18. The method of claim 17 wherein the metallic strip is fabricated by photo-chemical machining.

19. The method of claim 17 wherein the metallic strip is fabricated by stamping.

20. A creep resistant eyeglass frame front comprising:
    a plastic eyeglass frame front having a pair of rims integrally joined by a bridge region;
    the underside of the bridge region having a metallic strip encapsulated therein.

21. The creep resistant eyeglass frame front of claim 20 wherein the metallic strip includes open areas circumscribed by border regions, the open areas of the metallic strip defining a truss structure within and integral with the border regions.

22. The creep resistant eyeglass frame front of claim 20 wherein the metallic strip is encapsulated in the underside of the bridge region by cement.

23. The creep resistant eyeglass frame front of claim 20 wherein the metallic strip is encapsulated in the underside of the bridge region by epoxy cement.

24. A creep resistant eyeglass frame front comprising:
    a cellulose acetate eyeglass frame front having a pair of rims integrally joined by a bridge region;
    the underside of the bridge region having a metallic strip encapsulated therein with a epoxy cement, the metallic strip having open areas circumscribed by border regions, the open areas of the metallic strip defining a truss structure within and integral with the border regions.

25. A creep resistant eyeglass frame front comprising:
    an eyeglass frame front having a space in the bottom of a bridge region of the frame front;
    a sheet metal truss structure being secured in the space with a cement.

26. The creep resistant eyeglass frame front of claim 25 wherein the cement is a clear cement.

27. The creep resistant eyeglass frame front of claim 25 wherein the eyeglass frame front is a cellulose acetate eyeglass frame front.

* * * * *